No. 636,599. Patented Nov. 7, 1899.
L. WHITE.
AX.
(Application filed June 3, 1899.)
(No Model.)

WITNESSES:
Henry C. Johnson
Maurer Leonard.

INVENTOR
Leroy White.
BY
Hensey & Robinson
ATTORNEY

UNITED STATES PATENT OFFICE.

LEROY WHITE, OF LAKE CITY, MICHIGAN, ASSIGNOR OF ONE-HALF TO DAVID D. WALTON, OF SAME PLACE.

AX.

SPECIFICATION forming part of Letters Patent No. 636,599, dated November 7, 1899.

Application filed June 3, 1899. Serial No. 719,218. (No model.)

*To all whom it may concern:*

Be it known that I, LEROY WHITE, a citizen of the United States, residing at Lake City, in the county of Missaukee and State of Michigan, have invented certain new and useful Improvements in Axes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in axes; and it consists in an ax having a suitable recess to receive the end of the handle, combined with a cover, which is hinged to the main portion of the body of the ax and which when closed upon the handle secures it rigidly in position and at the same time forms a part of the ax-body, all of which will be more fully described hereinafter.

The object of my invention is to provide the body of an ax with a cover which can be opened for the purpose of allowing the end of the handle to be easily inserted in and removed from position and which when closed is flush with the side of the ax and forms a portion thereof.

Figure 1:
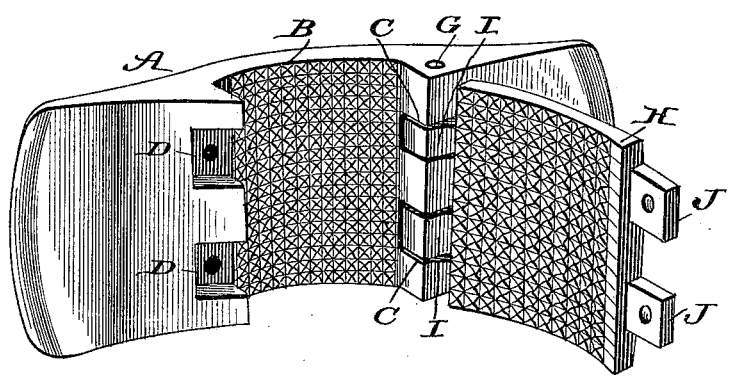
Figure 2:
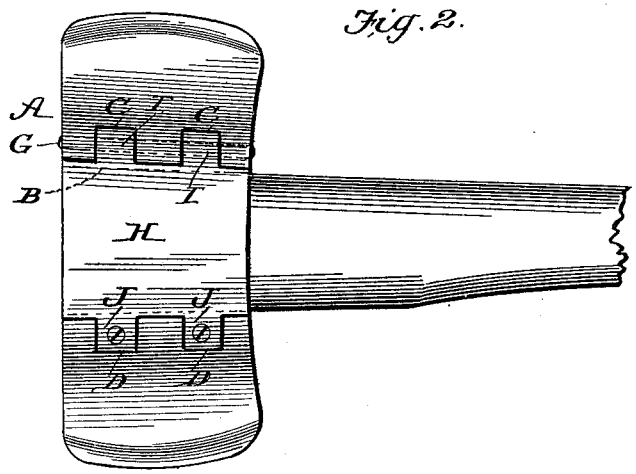

In the accompanying drawings, Figure 1 represents a perspective of the ax with the cover raised. Fig. 2 is an edge view of the same, showing the handle of the ax in position and the cover closed.

A represents the body of the ax, which is provided with a concaved recess B at its center to receive the end of the handle, and which body is provided with suitable recesses C D in its opposite edges. The surface of this concaved recess B is corrugated, roughened, or provided with points of any kind which will catch in or against the surface of the handle and prevent the ax from becoming readily detached therefrom. Pivoted in the recesses C upon one edge of the concaved recess B, by means of the pivot G, is the cover H, which is provided with the hinged portion I at one edge to fit in the recesses C and with the projections J at the other edge to fit in the recesses D. This cover is also corrugated, roughened, or provided with points in any suitable manner, so as to engage with the surface of the handle and prevent the ax from becoming readily detached. The opening between the cover and the ax is preferably made tapering from the inner to the outer surface of the ax, so that the outer end of the handle will be largest, and when the cover is closed down upon it it will be impossible for the ax to become accidentally detached. The cover is to be perfectly flush with the side of the ax-body when it is closed and may be secured by means of screws or any other suitable fastenings that may be preferred, the heads of the screws or other fastenings being countersunk, so that they will not interfere with the free use of the ax.

The great advantage of my invention consists in the easy manner by which the ax can be attached to the handle without skilled labor or experience of any kind. It is only necessary to open the cover, shape the outer end of the handle so as to fit in the recess B, then close the cover upon it and secure it in position at its free end. The handle being largest at its outer end and the recess B in the inner side of the cover being roughened, so as to take a firm hold thereof, the ax cannot possibly fly off or become loose while in use. Should the handle become broken at any time, it is only necessary to open the cover, remove it, and then substitute another.

Having thus described my invention, I claim—

An ax-body having a tapering recess B formed in its side, and which recess has the recesses C and D formed in opposite edges thereof, combined with the pivoted cover having hinge portions which fit in the recesses C and through which the pivot passes, and projections to fit in the recesses B, the recess in the inner side of the cover being corrugated or roughened so as to engage with the handle; and means for closing the cover so that it is held flush with the side of the body of the ax, substantially as described.

In testimony whereof I affix my signature in presence of two witnesses.

LEROY WHITE.

Witnesses:
GEO. W. WOOD,
W. WINTER.